May 11, 1971  M. R. BLOCH ET AL  3,578,503
DEVICES FOR THE ELECTROCHEMICAL GENERATION
OF ELECTRICAL CURRENT
Filed Sept. 19, 1967  2 Sheets-Sheet 1

INVENTOR
MOSHE R. BLOCH
CHAIM FORGACS
RONALD V. BOBKER

BY

ATTORNEY

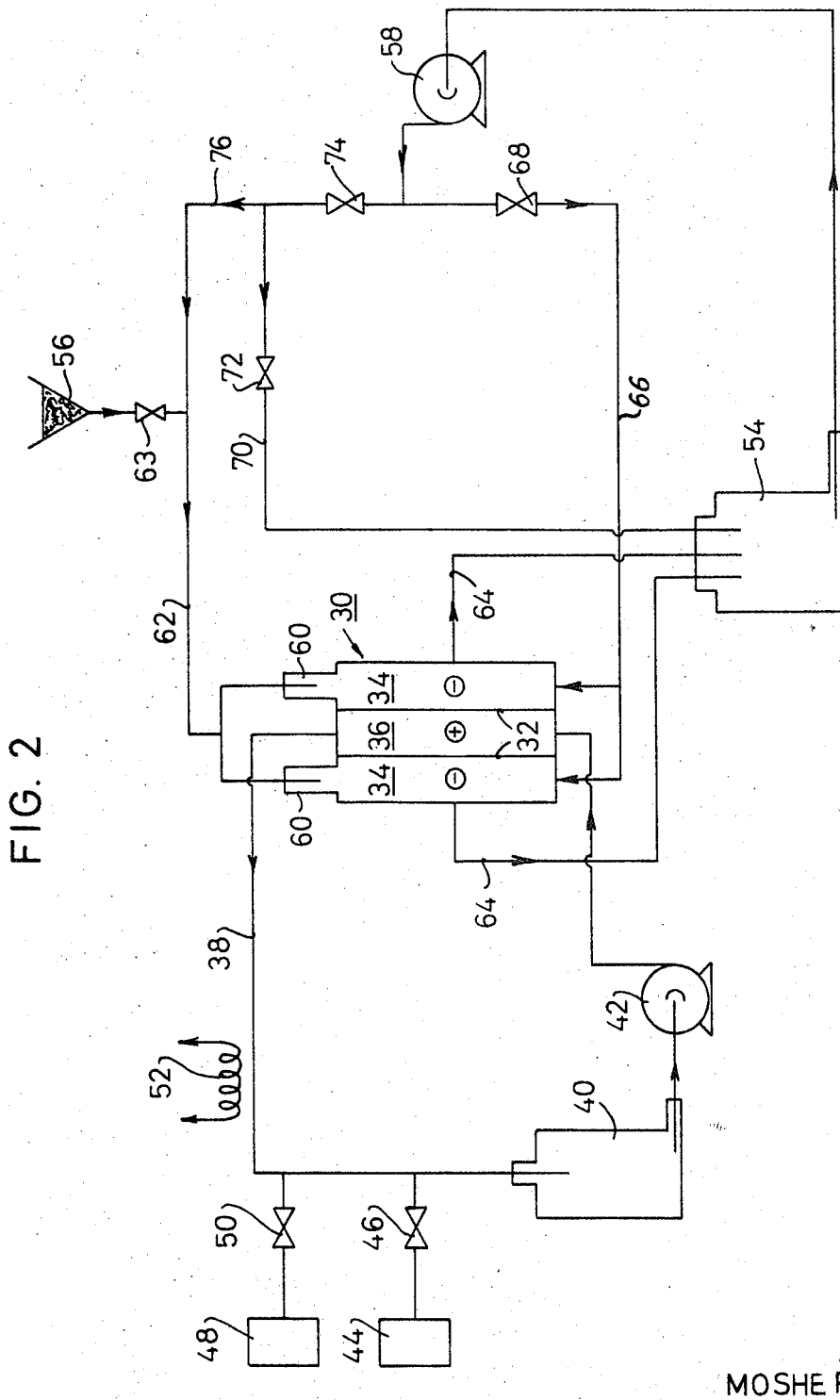

3,578,503
DEVICES FOR THE ELECTROCHEMICAL GENERATION OF ELECTRICAL CURRENT
Moshe R. Bloch, Chaim Forgacs, and Ronald V. Bobker, Beersheba, Israel, assignors to State of Israel represented by the Prime Minister's Office, Jerusalem, and Dead Sea Works Ltd., Beer Sheva, Israel
Filed Sept. 19, 1967, Ser. No. 668,783
Claims priority, application Israel, Aug. 11, 1967, 28,488
Int. Cl. H01m *17/00*
U.S. Cl. 136—102                                                7 Claims

ABSTRACT OF THE DISCLOSURE

A fuel cell comprising a cathode system and an anode system disposed in a chamber and separated by a permselective membrane. A liquid catholyte is continuously introduced into and circulated through the catholyte compartment, and an anolyte is continuously introduced into and circulated through the anolyte compartment. The anode system preferably includes a slurry of zinc particles dispersed in a zinc-bromide solution (the anolyte), and the cathode preferably includes a carbon electrode, bromine, and a zinc-bromide solution (the catholyte).

BACKGROUND OF THE INVENTION

Field of the invention

The present invention relates to devices for the electrochemical generation of electric current. The invention is particularly useful with respect to zinc-bromine electric cells, and is therefore hereinafter described with respect to this type of cell, but it will be appreciated that the invention, or various features thereof, could be used in other types of cells as well.

Description of the prior art

Zinc-bromine electric cells are known in which the anode is zinc, the cathode is carbon (e.g. porous graphite), and the electrolyte is an aqueous solution of zinc-bromide containing bromine. The open circuit voltage of this type of cell is about 1.8 volts. Such cells are attractive because of the high theoretical energy of the reactants, but they nevertheless have not yet come into wide-spread use, mainly because of the difficulties of: supplying the carbon (e.g. graphite) surface with sufficient elementary bromine when current is required; replenishing the zinc electrode in a manner not requiring the dismantling of essential cell compartments; preventing the bromine from diffusing to the zinc electrode without, at the same time unduly increasing the resistance to water and to ion migration; and or maintaining an optimum concentration of dissolved ions and bromine in the electrolyte and electro-active liquids without losses due to leakage current or undesired chemical reactions during generation of electricity and at rest.

Some or all of the above difficulties apply also to other types of electrical cells, for example cells in which the anode is cadmium or magnesium instead of zinc, and cells in which the cathode is of iodine, chlorine or oxygen (e.g., derived from air), instead of bromine.

SUMMARY OF THE INVENTION

An object of the present invention is to provide devices for the electrochemical generation of electric current having improvements with respect to the above difficulties.

A further object of the invention is to provide a design for an electric cell enabling the construction of efficient fuel cells. A fuel cell is one which, unlike a conventional primary or secondary electric cell, does not contain within it at any one time substantial amounts of the electroactive materials, these materials rather being continually added to the cell from the outside. The reaction products leaving the system may be regenerated (i.e. reconverted back to the original starting material), or may be disposed of, depending upon the economics of the two alternatives in any particular case.

According to one feature of the present invention, there is provided a device for the electrochemical generation of electric current including a cathode system and an anode system disposed in spaced relationship in a chamber, characterized in that a membrane is included in the chamber and divides same into a catholyte compartment containing the cathode system and an anolyte compartment containing the anode system. The catholyte compartment includes a liquid catholyte and means enabling the continuous introduction, circulation therethrough and exit of the liquid catholyte, and the anolyte compartment includes a liquid anolyte and means enabling the continuous introduction, circulation therethrough, and exit of said liquid anolyte.

According to one embodiment especially designed for use as a fuel cell, fuel supply tanks or the like are provided for supplying the electro-active materials to the device, and further tanks are provided for receiving the reaction products leaving the device. In another embodiment, the device includes means for continuously recirculating the catholyte from the outlet of the catholyte compartment back to the inlet thereof, means for continuously circulating the anolyte at a depolarizing rate from the outlet of the anolyte compartment back to the inlet thereof, and means for controlling the composition of the anolyte and the catholyte within the cell.

According to a further important feature of the invention, the membrane is a permselective membrane of ion exchange material. The one used in the embodiment described below has cation exchange properties. It has been found that the use of such a membrane is particularly advantageous in a zinc-bromine cell and prevents the bromine in the catholyte from diffusing to the zinc electrode without, at the same time, unduly increasing the resistance to water and cation migration into the catholyte.

The anode system may include dendritic, granular or porous metal, e.g. zinc, these being disposed within the cell in a manner enabling their convenient replacement at periodic intervals.

According to a further important feature of the invention, however, this electrode system includes a slurry of consumable metal particles dispersed or suspended in a liquid electrolyte. In this embodiment, means are provided for feeding into the cell the slurry of metal particles dispersed in the liquid, electrolyte, the cell including an outlet for electrolyte. The feeding means in this embodiment comprises a conduit for feeding the electrolyte to the cell, a reservoir for the metal particles, and a valve for controlling the flow of the metal particles from the reservoir to the conduit.

The foregoing features of the invention as indicated earlier, have been found particularly advantageous when the invention is embodied in a zinc-bromine cell, in which the anolyte and catholyte are both aqueous solutions of zinc-bromide, bromine being added to the catholyte preferably before introduction into the catholyte compartment. It will be appreciated, however, that all or several of these features could be used in other types of cells as well.

Further features and advantages of the invention will be apparent from the description below.

BRIEF DESCRIPTION OF THE DRAWINGS

The invention is herein described with reference to the accompanying drawings which illustrate, somewhat diagramatically and by way of example only, several embodiments of the invention.

In the drawings:

FIG. 2 illustrates another type of zinc-bromine fuel cell constructed in accordance with the invention.

DESCRIPTION OF THE PREFERRED EMBODIMENTS

Figure 1:
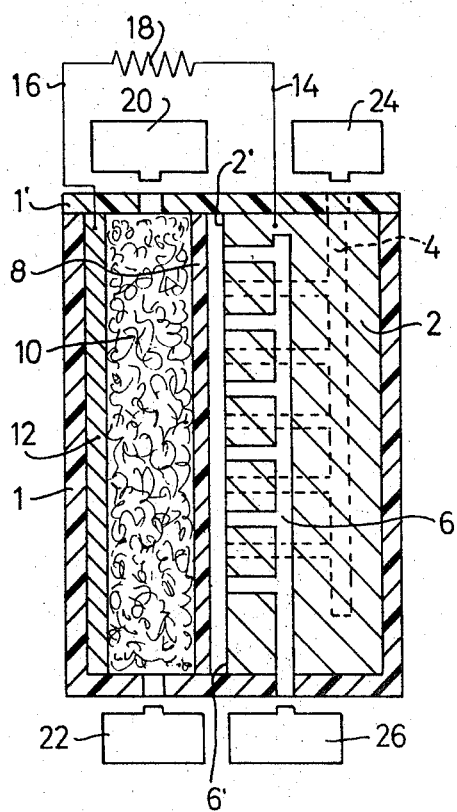
FIG. 1 illustrates one type of zinc-bromine fuel cell constructed in accordance with the invention.

With reference to FIG. 1 there is shown a zinc-bromine fuel cell constructed as follows: In an insulated housing 1 closed by a cover plate 1' is disposed a rectangular plate 2 of carbon (e.g. graphite) drilled to provide a plurality of vertical channels 4 extending from the upper surface of the plate and terminating short of the lower surface, the channels 4 being joined by a plurality of horizontal branches 4' extending to surface 2' of the plate. A second group of vertical channels 6 are similarly formed extending from the lower surface of the plate terminating short of the upper surface, these channels being joined by horizontal branches 6' extending to surface 2' of the plate.

Spaced from surface 2' of the carbon plate 2 is a separator 8, preferably a permselective membrane made of sulfonated film-forming polyolefin, e.g. polyethylene cation exchange material.

At the opposite side of membrane 8 is the zinc anode, which may be a felt of dendrites, a pile of granules, or porous metal particles of other forms. When such an anode is used, it can be easily introduced into the cell through an opening in the cover plate 1' or by removing the cover plate. At the opposite side of the zinc is a plate 12 of a metal more noble than zinc, e.g. copper.

The cathode terminal 14 is connected to carbon plate 2, and the anode terminal 16 is connected to plate 12, the external load between these two terminals being schematically shown by resistor 18.

The membrane 8 divides the cell into catholyte compartment in which is disposed the carbon plate 2, and an anolyte compartment in which is disposed the zinc particles 10 and copper plate 12. An aqueous solution of zinc bromide is introduced into the anolyte compartment through an inlet at one end of that compartment, the anolyte continuously circulating through the zinc particles and exiting through the outlet at the opposite end. The anolyte is preferably a solution of 450 grams per liter zinc bromide.

In FIG. 1, the zinc bromide anolyte may be added by means of a fuel supply tank 20 communicating with the inlet end of the anolyte compartment, a further tank 22 being provided at the outlet end of the compartment to receive the reaction products leaving that compartment. A different arrangement is shown in FIG. 2.

The catholyte is preferably a solution of 450 grams per liter zinc bromide to which has been added 400 grams per liter of bromine. This is introduced into the catholyte compartment through the inlet at the one end and flows through the vertical channels 4 and the horizontal branches 4' of graphite plate 2 to surface 2' of the plate. From there, it flows through branches 6' and then through vertical channels 6 to the outlet of the compartment. As in the case of the anolyte, the catholyte may be supplied by fuel tanks 24 connected to the inlet end of the catholyte compartment, a further tank 26 being provided at the outlet end for receiving the reaction products produced in the cell.

The anolyte and catholyte compartments at each side of membrane 8 are kept substantially at equal hydrostatic pressure.

This membrane, being made of cation exchange material, is permeable to water and zinc ions, but is substantially impermeable to bromine and to bromide ions. The membrane thus prevents the bromine from diffusing to the zinc electrode, without substantially increasing the resistance to water and to ion migration.

The zinc within the anolyte compartment may be periodically replaced as it is consumed. This may be conveniently done by introducing the zinc in the form of a dendritic felt or a porous block through an opening in the cover plate 1'.

According to another important feature of the invention, however, the zinc is preferably introduced into the cell in the form of a slurry of zinc particles suspended or dispersed in the anolyte. In the embodiment of FIG. 1, this slurry is supplied from fuel tank 20. The zinc suspended or dispersed in the slurry may be in the form of fine powder, granular particles, or dendritic particles.

The feature of introducing the zinc-electrode material in the form of a slurry of particles dispersed in the electrolyte produces a number of very important advantages. First, it provides a very simple and efficient way of periodically replacing the electrode material, enabling the cell to operate continuously. In addition, it enables an increased electrode surface area and also a continuous circulation of the electrode material and the electrolyte through the anolyte chamber, both of which decrease the internal resistance of the cell, improve the conductivity through the cell, and in general increase the efficiency of system.

Instead of using periodically refillable fuel tanks and periodically removable discharge tanks, a recirculation system may be provided for continuously or periodically introducing the electroactive materials and removing the resultant products. Such a system is illustrated in FIG. 2.

The cell 30 illustrated in FIG. 2 is shown for simplicity purposes as including two permselective membranes 32 providing two anode compartments 34 and an intermediate cathode compartment 36. It will be appreciated, however, that in a typical installation of the cell there would be a larger number of membranes providing a larger number of such compartments, the cathode compartments alternating with anode compartments.

The cathode compartment is fed by a conduit system 38 through which the catholyte (an aqueous solution of zinc bromide containing bromine) from a reservoir 40 is fed by a pump 42, the catholyte being introduced into the bottom of the compartment and being removed from the top. The bromine may be continuously or periodically introduced into the catholyte, this being schematically shown in FIG. 2 by the provision of a bromine reservoir 44 controlled by a valve 46. In actual practice, however, the catholyte would preferably be bubbled through the reservoir containing the bromine so that the catholyte picks up the bromine as it circulates through the system. The catholye recirculaion system also includes a source of water in tank 48 flowing through a valve 50 for controlling the composition of the catholyte. In addition, a heat-exchanger 52 may be provided for cooling the recirculating catholyte, preferably to a temperature of about 50° C., the heat picked up in the heat exchanger being useful for external purposes, e.g., for distilling bromine and water into their reservoir for introduction into the recirculating system.

The recirculating system for the anolyte includes a reservoir 54 for the anolyte (an aqueous solution of zinc-bromide), a second reservoir 56 for the zinc particles, and a pump 58. The cell 30 includes a tube 60 connected to an inlet end (the upper end) of each of the anode compartments 34, zinc reservoir 56 being connected to each of the tubes 60 by means of a conduit 62. A valve 63 controls the flow of the zinc particles from its reservoir 56 to conduit 62. The outlet of each anode compartment is connected by a conduit 64 to the anolyte reservoir 54. A second inlet conduit 66 is provided at the lower end for introducing only the catholyte (i.e. without the zinc particles) into each anode chamber, this conduit being fed with the anolyte from reservoir 54 by means of pump 58 and a control valve 68. In addition, a bypass conduit 70 controlled by a valve 72 is provided for directing the anolyte from pump 58 back to the reservoir 54 instead of to the cell. A further valve 74 is provided in the conduit 76 connecting pump 58 to conduit 62 through which the zinc particles are introduced into the anode compartments.

The operation of the catholyte circulating system will be apparent from the foregoing description. Pump 42 feeds the catholyte (containing bromine) to the cathode compartment 36, the spent catholyte being recirculated back to the reservoir through conduit 38. Water from tank 48 may be periodically or continuously added through valve 50 in order to control the composition of the catholyte, and similarly bromine may be periodically or continuously added from tank 44 through valve 46.

The operation of the anolyte circulation system is slightly more complicated. During starting up conditions, no zinc particles are fed from reservoir 56 into the anode compartments 34. Valve 60 is open and valves 74, 72 and 63 are all closed, whereby the anolyte alone is forced by pump 58 from reservoir 54 through conduit 66 into the anode compartments and then is circulated back to the reservoir through conduits 64. When the zinc particles are to be added, valve 68 is closed, and valves 63 and 74 are both opened, valve 72 remaining closed. The anolyte is now directed from pump 58 to conduits 76 and 62 to the upper end of each anode compartment 34. The anolyte entering the anode compartments contains zinc particles from reservoir 56 flowing through open valve 63. When the anode compartments contain sufficient zinc particles, valve 63 is closed, shutting off the flow of the zinc particles to the anolyte. For periodically stirring up the slurry within the compartments, the valve may be controlled as described in the starting up operations for directing the flows of the anolyte from pump 58 into the anode compartments through conduit 66, rather than through conduit 62.

Conduit 70 and valve 72 provide a by-pass for the anolyte, so that when the anode compartments contain enough anolyte and zinc, valves 68 and 63 are closed, and valves 74 and 72 are open, causing the anolyte to flow from pump 58 back to the reservoir 54.

The provision of the tubes 60 at the upper inlet and of each of the anode compartments 34 obviates the need for close regulation of the flow of zinc particles from reservoir 56, since if the zinc particles are introduced at a rate greater than they are consumed within the cell, these tubes will hold the excess particles until required within the cell.

The structure of the carbon electrode within the cathode compartment 36 may be the same as illustrated in FIG. 1, except that both faces of the electrode would be active, and therefore both would communicate with the horizontal branches 4' and 6' extending to the active surfaces. Of course, any other electrode could be used, for example a porous graphite electrode.

Figure 3:
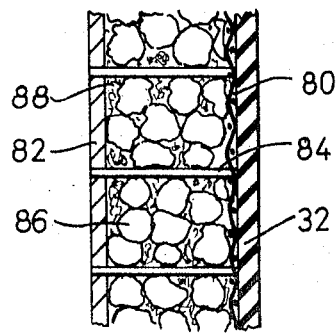
FIG. 3 illustrates an electrode system which may be used in this cell.

The anode electrode within the anode compartments 34 could also be of the same structure as illustrated in FIG. 1. Preferably, however, the anode structure in the FIG. 2 embodiment is as illustrated in FIG. 3. Here, a metal screen or net 80 is disposed against the permselective membrane 32, and a back plate 82 is spaced from screen 80 by means of a plurality of rods 84. Elements 80, 82 and 84 are all made of conducting material, preferably copper. The space between screen 80 and back plate 82 is filled with large conducting granules 86, e.g. of a diameter of 4–5 mm., which may be of zinc, or of some other conductive material such as copper or graphite. Granules 86 are large compared to the size of the zinc particles.

The zinc slurry 88 enters the anode compartments at the top, and the zinc particles are caught by the large conducting granules, the latter acting in the nature of a filter, while the anolyte itself continues to the anolyte reservoir 54. In operation, it was found that the copper screen 80 becomes covered with a plating of zinc, so that there is little tendency for the copper to undergo chemical attack. The lower limit of zinc particle size is governed by the fineness of the copper screen, while the upper limit depends upon the power of the pump used. Particle size of up to 10 mesh have been used without difficulty. The ratio of the metal particles to liquid anolyte is of no special significance because the anode compartment automatically filters out the metal particles from the electrolyte stream if the ratio is low. If the ratio is very high, the inlet tubes 60 fill up with the metal particles, as described earlier, the particles entering the cell at the rate called for by the rate of dissolution of the zinc within the cell.

Where a battery of cells are used, each anode compartment being separated by a cathode compartment, it will be appreciated that both faces of the anode electrode could be made active by including a second screen or net 80, instead of the back plate 82, there being a permselective membrane 32 against the latter screen as well.

The current densities suitable for the continuous work are in the order of up to 150 ma./cm.$^2$ of anode at 1 volt. The circulation by the pumps is of course interrupted when no current is required.

It will thus be seen that in the embodiments of the invention described the carbon electrode is provided with a continuous supply of bromine, and that the zinc electrode material may be replaced in a manner not requiring the complete dismantling of the cell. Further, the bromine is prevented, by the presence of the membrane, from diffusing to the zinc electrode. Still further, the arrangements described enable the maintenance of optimum concentrations of dissolved ions and bromine. In addition, the continuous flow of the electro-active materials through the cell continuously flushes and depolarizes the electrodes, and therefore the maximum voltage (about 1.8 volts for a single cell) is maintained substantially at all times. This high voltage, together with the high current yield for such cells, makes these cells particularly suitable for the operation of automotive vehicles or for similar applications. The fact that the cells may also be constructed as fuel cells, in which the electro-active materials are periodically or continuously replaceable in a convenient manner, further enhances the usefulness of such cells.

The various features of the invention described above are preferably embodied in a zinc-bromine cell, but it will be appreciated, as discussed above, that all or some of these features, could be used in other types of cells. Examples mentioned above are cells in which the anode is of cadmium or magnesium, and/or in which the electroactive material in the catholyte is iodine, chlorine or air (oxygen). The use of the zinc-slurry arrangement described in FIGS. 2 and 3 is particularly applicable in zinc-air fuel cells. Further examples will be apparent to those skilled in this art.

We claim:

1. A device for the electrochemical generation of electric current comprising: an anolyte compartment including a zinc anode and an anolyte of an aqueous solution of zinc bromide; a catholyte compartment including a cathode and a catholyte of an aqueous solution of zinc bromide and bromine; and a permselective membrane of ion exchange material interposed between said compartments; said permselective membrane being permeable by water and the anode ions but being substantially impermeable by bromine and bromide ions.

2. A device as defined in claim 1, wherein said anode includes porous zinc.

3. A device as defined in claim 1, wherein said anode includes consumable zinc particles added to said anolyte and forming a slurry therewith.

4. A device as defined in claim 3, wherein said anolyte compartment also includes a pair of spaced metal plates at least one of which is a metal screen, and granules of a conducting material disposed in said space, said granules being substantially larger than said consumable metal particles.

5. A device for the electrochemical generation of electric current, comprising: a catholyte compartment and an anolyte compartment; said catholyte compartment including a cathode electrode and a liquid catholyte, and being formed with an inlet at one end and an outlet at the opposite end enabling the continuous introduction, circulation therethrough, and exit of said liquid catholyte; said anolyte compartment including an anode electrode and a liquid anolyte, and being formed with an inlet at one end and an outlet at the opposite end enabling the continuous introduction, circulation therethrough, and exit of said liquid anolyte; said anolyte being an aqueous solution of zinc bromide, and said catholyte being an aqueous solution of zinc bromide and bromine; and a permselective membrane separating said compartments and being permeable by water and the anode ions but being substantially impermeable by bromine and bromide ions.

6. A device as defined in claim 5, further including a supply tank connected to said catholyte compartment inlet for supplying thereto said catholyte, a second supply tank connected to said anolyte compartment inlet for supplying thereto said anolyte, a discharge tank connected to said catholyte compartment outlet, and a second discharge tank connected to said anolyte compartment outlet.

7. A device as defined in claim 5, further including means for continuously recirculating said catholyte from the outlet of said catholyte compartment back to the inlet thereof, means for continuously recirculating said anolyte from the outlet of said anolyte compartment back to the inlet thereof, and means for controlling the compositions of said anolyte and catholyte recirculated back to the inlets of their respective compartments.

References Cited

UNITED STATES PATENTS

| | | | |
|---|---|---|---|
| 312,802 | 2/1885 | Bradley | 136—30 |
| 2,921,110 | 1/1960 | Crowley et al. | 136—86 |
| 3,124,520 | 3/1964 | Juda | 136—86UX |
| 3,134,698 | 5/1964 | Neipert et al. | 136—83 |
| 3,214,296 | 10/1965 | Smatko | 136—86 |
| 3,234,116 | 2/1966 | Holt et al. | 136—86 |
| 3,382,102 | 5/1968 | Zito, Jr. | 136—86X |
| 3,294,586 | 12/1966 | LeDuc | 136—86 |
| 2,384,463 | 9/1945 | Gunn et al. | 136—86 |
| 3,362,852 | 1/1968 | Corren et al. | 136—86 |
| 3,409,471 | 11/1968 | Sturm et al. | 136—86 |

OTHER REFERENCES

Ionics, Tech. Bulletin CR61, 1964, pp. 1 and 2.

ALLEN B. CURTIS, Primary Examiner

M. J. ANDREWS, Assistant Examiner

U.S. Cl. X.R.

136—83, 100